United States Patent [19]

Noda

[11] Patent Number: 4,749,148
[45] Date of Patent: Jun. 7, 1988

[54] CLUTCH OPERATING DEVICE FOR A FISHING REEL

[75] Inventor: Hideo Noda, Sakai, Japan

[73] Assignee: Shimano Industrial Company Limited, Osaka, Japan

[21] Appl. No.: 52,614

[22] Filed: May 21, 1987

[30] Foreign Application Priority Data

Jun. 11, 1986 [JP] Japan ............................ 61-88629[U]

[51] Int. Cl.$^4$ ............................................ A01K 89/015
[52] U.S. Cl. ................................... 242/218; 242/220
[58] Field of Search ............................... 242/217–220, 242/211–213

[56] References Cited

U.S. PATENT DOCUMENTS

| 4,281,808 | 8/1981 | Noda | 242/218 |
| 4,369,936 | 1/1983 | Noda | 242/220 |
| 4,513,930 | 4/1985 | Sato | 242/218 |
| 4,575,024 | 3/1986 | Kaneko | 242/218 |
| 4,593,869 | 6/1986 | Yasui et al. | 242/218 |

FOREIGN PATENT DOCUMENTS 60-94048 5/1985 Japan.

Primary Examiner—John M. Jillions
Attorney, Agent, or Firm—Stevens, Davis, Miller & Mosher

[57] ABSTRACT

A fishing reel which includes a clutch lever for disengaging a clutch and a torsion spring for selectively biasing the clutch lever toward its forward movement position where the clutch is disengaged or its backward movement position where the clutch is engaged. The reel includes a return spring having a restoring force smaller than a biasing force of the torsion spring for the clutch lever at its forward movement position and biasing the clutch lever only in the restoring direction and a biasing force control mechanism for controlling the biasing force of the torsion spring for the clutch lever at its forward movement position to be reduced more than the restoring force of the return spring.

6 Claims, 4 Drawing Sheets

CLUTCH OPERATING DEVICE FOR A FISHING REEL

FIELD OF THE INVENTION

The present invention relates to a clutch operating device for a fishing reel, and more particularly, to a clutch operating device provided with a clutch lever moving in reciprocation with respect to a clutch means, where the clutch lever moves forwardly to disengage the clutch means to enable free rotation of a spool of the fishing reel and moves backwardly to engage the clutch means to transmit therethrough a driving force from a driving mechanism at the fishing reel to the spool to be rotatably driven.

BACKGROUND OF THE INVENTION

A conventional fishing reel provided with a clutch operating device constructed as described above is well-known and is disclosed in, for example, Japanese Patent Laid-Open Gazette No. Sho 60-94,048. The clutch operating device is provided with a clutch lever, a torsion spring for selectively biasing the clutch lever toward its forward movement position or its backward movement position, a return spring which has a restoring force larger than the biasing force of the torsion spring for biasing the clutch lever toward its forward movement position and biases the clutch lever to the backward movement position thereof, and a change-over control mechanism for changing over the return spring to the condition of applying the restoring force thereof to the clutch lever and the condition of releasing the clutch lever.

In such reels, when an angler casts a fishing line during fishing, he operates an operating member to change over the return spring from its acting condition to its release condition, thereby forwardly moving the clutch lever against the torsion spring to disengage the clutch means, and the angler rotates a handle to return the clutch lever, thereby engaging the same. When the clutch lever is operated little by little to draw out the line or stop it for "flipping fishing", the operating member is operated to change over the return spring from the release condition to the acting condition and vice versa, whereby the clutch lever forwardly moves against the return spring to disengage the clutch means and is restored by the return spring to engage the same.

For flipping fishing using the conventional clutch operating device, the clutch lever forwardly moves to deflect the return spring having a restoring force larger than the biasing force of the torsion spring for the clutch lever at its forward movement position, whereby it is not easy to operate the clutch lever little by little because of heavy handling thereof and also an angler is apt to become tired due to finger operation of the clutch lever.

SUMMARY OF THE INVENTION

An object of the present invention is to provide a clutch operating device for a fishing reel, which uses a torsion spring for selectively biasing the clutch lever to the forward movement position or the backward movement position and a return spring for biasing the clutch lever to the backward movement position, thereby allowing the angler to properly select casting or flipping fishing. Moreover, a control means is provided to control the biasing force of the torsion spring to enable flipping fishing with a light touch, so that the angler becomes less tired from finger control of the clutch lever.

The clutch operating device for a fishing reel of the invention is provided with (1) a clutch lever forwardly and backwardly movable with respect to the clutch means so as to forwardly move to disengage the clutch means, (2) a torsion spring for selectively biasing the clutch lever to the forward or backward movement position (3), a return spring having a restoring force smaller than a biasing force of the torsion spring for the clutch lever at its forward movement position and biasing the clutch lever only in the backwardly moving direction, and (4) a biasing force control mechanism for controlling the biasing force of the torsion spring for the clutch lever at the forward movement position thereof so that it is smaller than the restoring force of the return spring. The present invention is characterized in that the return spring is smaller in biasing force than the torsion spring, whereby the biasing force thereof for the clutch lever at its forward movement position is controlled to be smaller than the restoring force of the return spring. Accordingly, in the condition where the biasing force of the torsion spring for the clutch lever at the forward movement position thereof is larger than the restoring force of the return spring, when the clutch lever is forwardly moved, the torsion spring is inverted in the acting direction to bias the clutch lever toward the forward movement position, thereby disengaging the clutch means. Thus, in such condition, the fishing line is cast. Also, the clutch lever, the same as in the conventional reel, is restored by operating the handle. The biasing force control mechanism reduces the biasing force of the torsion spring for the clutch lever at the forward movement position thereof more than the restoring force of the return spring, whereby the clutch lever is operated little by little with a light touch so that the angler gets less fatigued by finger operation of the clutch lever. Also, the clutch lever is released from its forward movement position so as to be restored by the restoring force of the return spring.

Thus, while carrying out casting by disengaging the clutch means, the engagement and disengagement of the clutch means can be repeated so as to draw out little by little the line carrying, for example, a lure, or stop it, thereby desirably selectively carrying out so-called flipping fishing. Moreover, in a case of flipping fishing, the clutch lever is operable by an extremely smaller force, thereby enabling the angler to carry out the flipping fishing with less fatigue over a long time.

These and other objects of the invention will be more fully apparent from the detailed description and examples which follow.

DETAILED DESCRIPTION OF THE INVENTION

Figure 3:
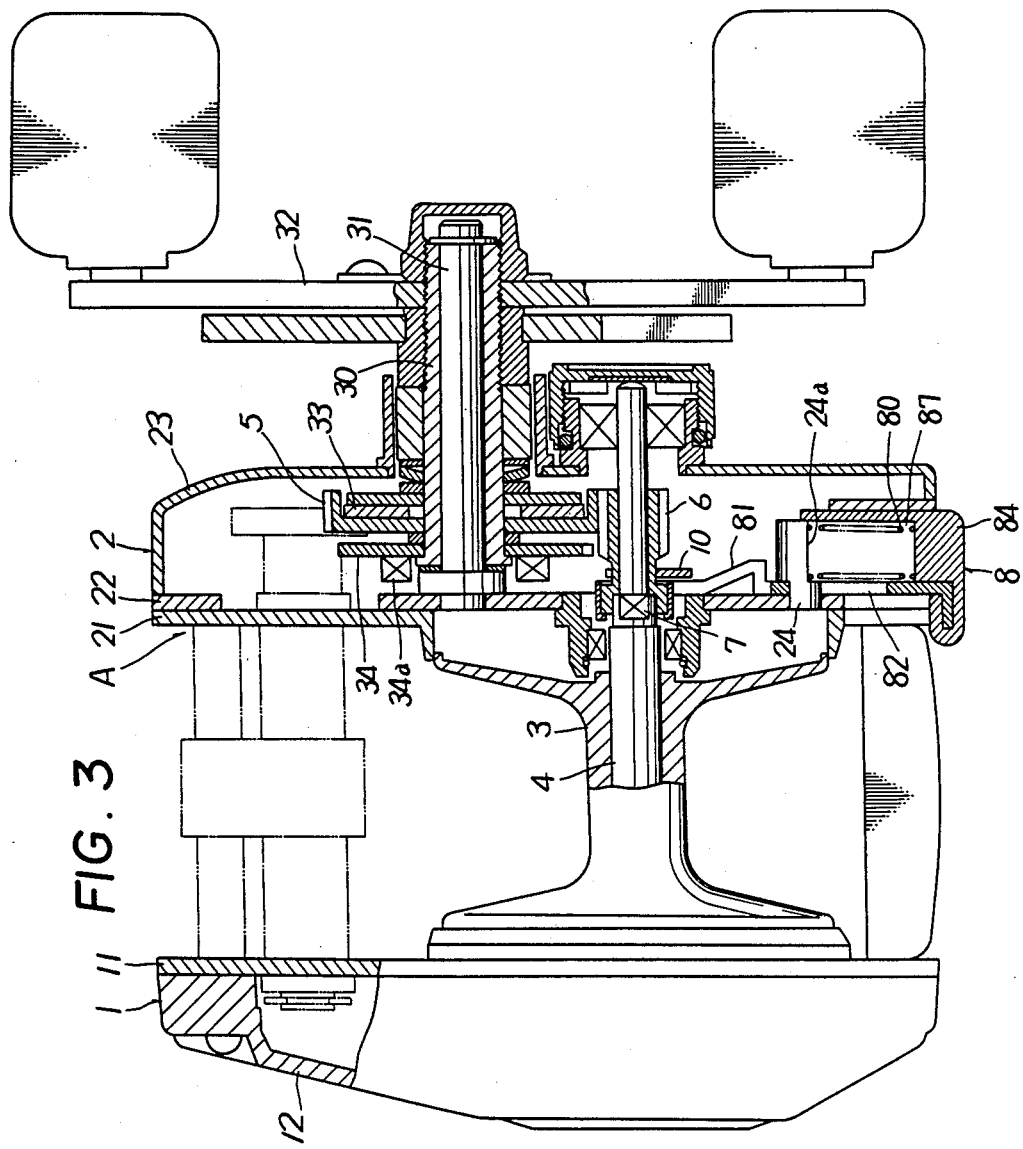
FIG. 3 is a partial sectional view of the entire fishing reel of FIG. 1.

Referring first to FIG. 3, a double bearing fishing reel is shown, in which a reel body A is provided with a first side frame 1 comprising a side plate 11 and a cup-like cover 12, a second side frame 2 comprising a side plate 21, a doubling plate 22 attached to the outside thereof and a cup-like cover 23 attached to the outside thereof, and a plurality of connecting rods (not shown) for connecting the first and second side frames 1 and 2. A spool shaft 4 having a spool 3 is supported rotatably between the first and second side frames 1 and 2, and a handle shaft 30 carrying thereon a master gear 5 is supported rotatably through a support shaft 31 between the doubling plate 22 and the cup-like cover 23. Handle shaft 30 projects at one end outwardly from the cover 23 so as to enable a handle 32 to be fixed to this projecting portion. The spool shaft 4 extends at one end outwardly to enter into the cover 23 and rotatably and axially slidably supports at this entering portion a pinion 6 engageable with the master gear 5. A clutch means 7 is provided between the pinion 6 and the spool shaft 4 and engages or disengages by forward and backward movements of a clutch lever 8 to be discussed below, the clutch means 7 engaging to transmit a driving force from the handle 32 to the spool shaft 4 through the master gear 5, pinion 6 and clutch means 7, thereby rotating the spool 3. The clutch means 7 disengages to allow the spool 3 to freely rotate.

Onto the entering portion of the handle shaft 30 into the cover 23 is rotatably inserted the master gear 5 and are not-rotatably inserted a friction plate 33 and an anti-reverse-rotation plate 34 having a plurality of return projections 34a, so that a driving force is transmitted from the handle shaft 30 to the master gear 5 through the friction plate 33.

The clutch means 7 comprises flat faces provided at an intermediate portion of the spool shaft 4 and a cylindrical portion provided at the pinion 6 and having a not-round inner surface engageable with the flat faces, the cylindrical portion thereof disengaging from the flat faces at the spool shaft 4 by operation of clutch lever 8, thereby enabling free-rotation of spool shaft 4 and spool 3 thereon.

The clutch operating device of the invention is applied to the fishing reel constructed as above-mentioned and comprises the clutch lever 8 moving in reciprocation with respect to the clutch means 7 and moving forwardly to disengage the clutch means 7, a torsion spring 20 for selectively biasing the clutch lever 8 to the forward movement position or the backward movement position thereof, a return spring 80 and a biasing force control mechanism 9 discussed below.

The clutch lever 8 is provided relative to a clutch yoke 10 which holds the pinion 6 and biases it always in the direction of engaging the clutch means 7. The clutch lever 8 is formed preferably of a metal plate which is furcate and comprises an urging portion 81 for biasing the clutch yoke 10, an elongate bore 82 extending radially of the spool shaft 4, a spring holder 83, and an operating part 84 at the root of the clutch lever 8.

Figure 1:
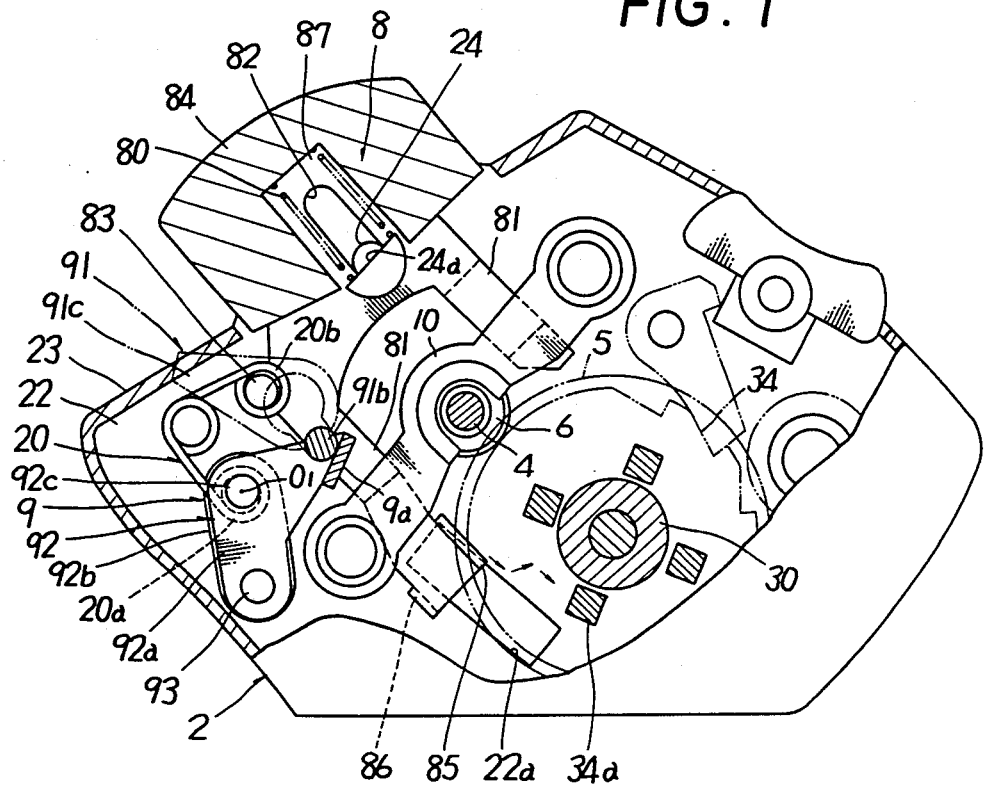
FIG. 1 is a partial cutaway side view of an embodiment of a fishing reel applied with a clutch operating device of the invention.

Also, the clutch lever 8 is supported to the doubling plate 22 through a guide pin 24 to be movable in reciprocation therethrough and swingable therearound in a predetermined range only. Guide pin 24 is fixed at one end to the doubling plate 22 and enters at its other end into the elongate slot 82. The torsion spring 20 is interposed between the spring holder 83 at the clutch lever 8 and the doubling plate 22, so that, when the clutch lever 8 moves forwardly, a contact portion 85, which is provided at the utmost end of one leg of the clutch lever 8 and is capable of contacting the return projection 34a at the anti-reverse-rotation plate 34, moves radially inwardly thereof and a retaining part 86 near the contact portion 85 engages with a cutout 22a, thereby holding the clutch lever 8 at the termination of its forward movement. Thus, the clutch lever 8 moves forwardly against the torsion spring 20 to move the clutch yoke 10 axially, whereby the pinion 6 moves axially to disengage the clutch means 7. The handle 32 is rotated to hit the contact portion 85 by means of the return projection 34a, whereby the clutch lever 8 swings around the guide pin 24 and moves backwardly toward the backward movement position as shown in FIG. 1. Hence, the pinion 6 is biased by the clutch yoke 10 to move in the direction of engaging the clutch means 7.

In the embodiment shown in FIGS. 1 through 6, between the second side frame 2 and the clutch lever 8 is provided the return spring 80 having a restoring force smaller than the biasing force of the torsion spring 20 for the clutch lever 8 at its forward movement position and biasing the clutch lever 8 always toward the backward movement position thereof. Also, between the second side frame 2 and the torsion spring 20 is provided a biasing force control mechanism 9 having an operating member 91 for reducing the biasing force of the torsion spring 20 for the clutch lever 8 at its forward movement position more than the restoring force of the return spring 80.

In the above-described construction, the torsion spring 20 is formed of a wire rod coiled at both its ends and also at an intermediate portion thereof and arranged in a substantially V-shape. Spring 20 is supported at a first coiled end or spring leg 20a to the second side frame 2 through the control mechanism 9 and at a second coiled end or spring leg 20b to the spring holder 83 at the clutch lever 8. Thus, the clutch lever 8 forwardly moves to reverse the torsion spring 20 in the biasing direction thereof.

The return spring 80 is formed of a coil spring, housed in a cavity 87 provided at the operation portion 84 at the clutch lever 8, and supported to a spring seat 24a at the utmost end of the guide pin 24, thereby biasing the clutch lever 8 always in the backwardly moving direction thereof.

The biasing force control mechanism 9 comprises the operating member 91 pivotally supported to the cup-like cover 23 and a spring holder 92 supporting the first coiled end 20a of the torsion spring 20. Spring holder 92 is pivoted to the doubling plate 22 so that the operating member 91 is operated to change the first coiled end 20a in position with respect to the second side frame 2 to thereby reduce the biasing force of the torsion spring 20.

Figure 2:
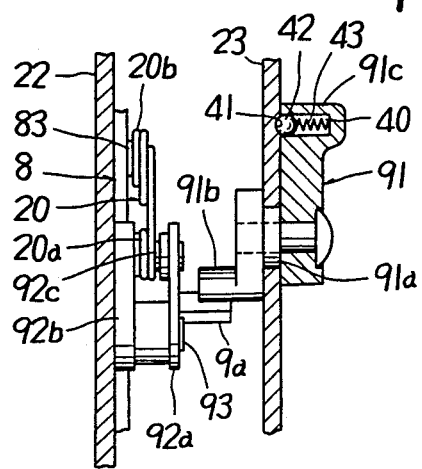
FIG. 2 is a partial sectional view of a biasing force control mechanism according to the invention.

The operating member 91, as shown in FIG. 2, comprises a shaft portion 91a, a transmitting portion 91b shifted with respect to the axis of the shaft portion 91a, and a knob 91c mounted on the shaft portion 91a. Shaft portion 91a is pivoted to the cover 23, and knob 91c projects outwardly therefrom. A positioning mechanism 40 for the operating member 91 is provided between the knob 91c and the cover 23. The positioning mechanism 40 serves to position the operating member 91 at the control position where the biasing force of the torsion spring 20 for the clutch lever 8 at the forward movement position thereof is reduced more than the restoring force of the return spring 80 and at the non-control position. Positioning mechanism 40 comprises a pair of recesses 41, an engaging member 42 selectively engageable with one of the recesses 41, and a spring 43 to bias the engaging member 42 toward each recess 41.

The spring holder 92 comprises a first arm 92a of a substantially V-like shape and having a driven portion 9a engageable with the transmitting portion 91b, a second arm 92b of an I-like shape and opposite to the first arm 92a, and a connecting shaft 92c for connecting the first and second arms 92a and 92b at one ends thereof in relation of being spaced from each other at a predetermined interval. The first and second arms 92a and 92b are mounted at their other ends swingably on the doubling plate 22 through a mounting shaft 93, the torsion spring 20 being supported at the first coiled end 20a to the connecting shaft 92c. In addition, the distance between the axis of the mounting shaft 93 at the spring holder 92 and the driven portion 9a is made larger than that between the axis of the shaft portion 91a at the operating member 91 and the transmitting portion 91b.

Figure 4:
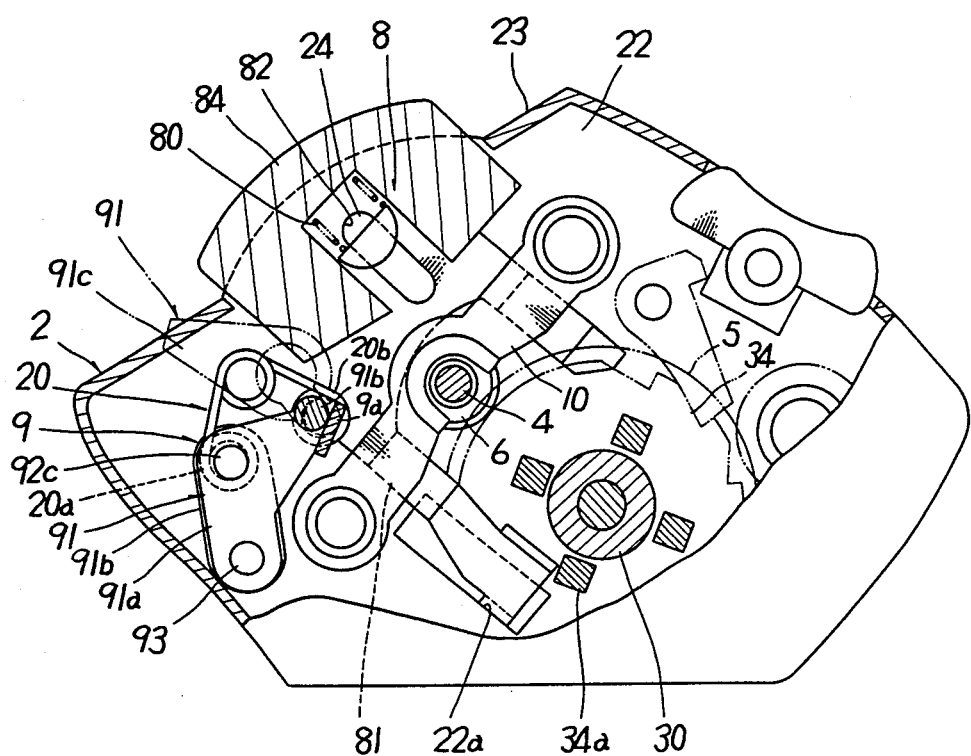
FIG. 4 is a side view showing a clutch lever moved forwardly, corresponding to FIG. 5, and FIGS. 5 and 6 are views illustrating reel operation for so-called "flipping fishing".
Figure 5:
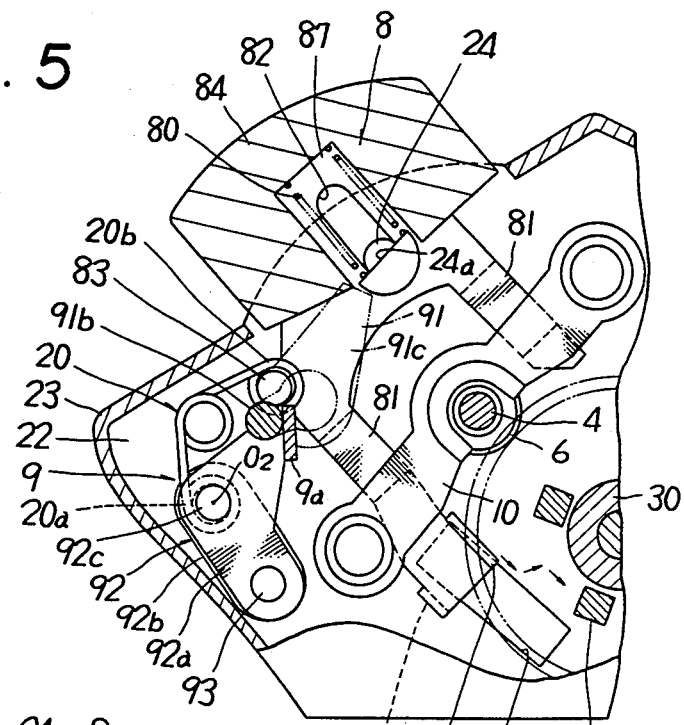
Figure 6:
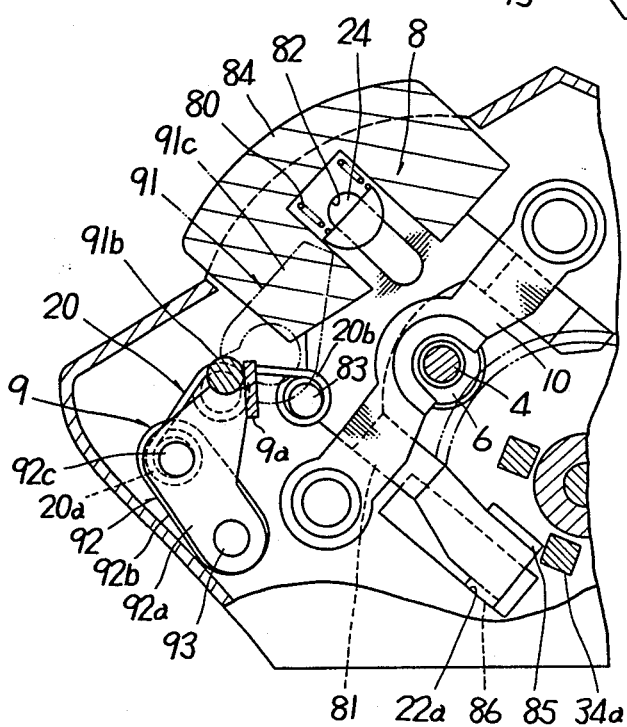

In the present invention constructed as described when the angler intends to cast the line during fishing, he changes over the operating member 91 to the position where the biasing force of the torsion spring 20 for the clutch lever 8 at its forward movement position becomes larger than the restoring force of the return spring 80 as shown in FIG. 1. When the clutch lever 8 is forwardly moved in the condition shown in FIG. 1, the torsion spring 20 is reversed in the biasing direction, whereby the clutch lever 8, as shown in FIG. 4, is biased to the forward movement position and the clutch yoke 10 moves to disengage the clutch means 7. Hence, the spool 3 is able to freely rotate to enable the line to be cast therefrom.

In the condition shown in FIG. 4, when the handle 32 is rotated, the return projection 34a hits the engaging portion 85 so that the clutch lever 8 moves in the restoring direction and the torsion spring 20 is reversed in the biasing direction to bias the clutch lever 8 in the restoring direction, whereby the clutch yoke 10 moves to engage the clutch means 7. Accordingly, the driving force of the handle 32 is transmitted to the spool 3 through the clutch means 7, thereby winding up the line onto the spool 3.

Next, when the angler operates the clutch lever 8 little by little to draw out or halt the line and dance the lure to allure a fish, such as a blackbass, thereby trying so called "flipping fishing", he changes over the operating member 91 to the control position where the biasing force of the torsion spring 20 for the clutch lever 8 at its forward movement position is made smaller than the restoring force of the return spring 80. Hence, the first coiled end 20a of the torsion spring 20 shifts from the point O₁ in FIG. 1 to point O₂ in FIG. 5, whereby an amount of deflection of the torsion spring 20 decreases and its biasing force is smaller than the restoring force of the return spring 80. In the condition shown in FIG. 5, the clutch lever 8 is forwardly moved to disengage the clutch means 7, and is released from the forward movement to restore the clutch lever 8 by the restoring force of the return spring 80, thereby engaging the clutch means 7.

Since the restoring force of the return spring 80 is smaller than the biasing force of the torsion spring 20 for the clutch lever 8 at its forward movement position, the clutch lever 8 can be forwardly moved by a light touch and the angler becomes less tired from finger operation of clutch lever 8.

In addition, the return spring 80 may alternatively use a leaf spring or a wire rod spring.

Alternatively, the biasing force control mechanism 9 may linearly move the operating member 91, or the first coiled end 20a of the torsion spring 20 may be directly supported to the operating member 91. Thus, the control mechanism 9 is not particularly defined or limited in its construction.

While an embodiment of the invention has been shown and described, the invention is not limited to the specific construction described above, since the disclosed embodiment is merely exemplary and the scope of the invention is not limited thereto but is defined by the attached claims.

What is claimed:

1. A fishing reel comprising:
    a clutch, and
    an operating device for said clutch, said operating device comprising:
    (a) a clutch lever movable in a forward movement direction and in a backward movement direction with respect to said clutch, with forward movement of said clutch lever functioning to disengage said clutch,
    (b) a torsion spring which selectively biases said clutch lever toward one of a forward movement position and a backward movement position thereof,
    (c) a return spring which biases said clutch lever only in said backward movement direction and having a restoring force acting on said clutch lever which is smaller than a biasing force of said torsion spring acting on said clutch lever at said forward movement position thereof, and
    (d) a biasing force control mechanism comprising an operating member for controlling said biasing force of said torsion spring acting on said clutch lever at said forward movement position to be weaker than said restoring force of said return spring acting on said clutch lever.

2. A fishing reel according to claim 1, wherein said torsion spring is provided with first and second spring legs, said first spring leg being supported to said biasing force control mechanism, and said second spring leg being supported to said clutch lever.

3. A fishing reel according to claim 2, wherein said biasing force control mechanism is provided with an operating member and a spring holder operating in cooperation with said operating member, said first spring leg of said torsion spring being supported to said spring holder.

4. A fishing reel according to claim 3, wherein said operating member is supported movably to a reel body at said fishing reel, and between said operating member and said reel body is provided a positioning mechanism for positioning said operating member (i) at a control position at which a biasing force of said torsion spring for said clutch lever at said forward movement position is reduced more than a restoring force of said return spring and (ii) at a non-control position.

5. A fishing reel according to claim 3, wherein said operating member and said spring holder are supported swingably to a reel body at said fishing reel, said operating member being provided with a transmitting portion for transmitting operation of said operating member to said spring holder, and said spring holder being provided with a driven portion engageable with said transmitting portion to receive an operating force therefrom.

6. A fishing reel according to claim 5, wherein a distance between a center of swinging motion of said spring holder and driven portion thereof is larger than a distance between a center of swinging motion of said operating member and said transmitting portion thereof.

* * * * *